(12) United States Patent
Dollase et al.

(10) Patent No.: US 6,723,407 B2
(45) Date of Patent: Apr. 20, 2004

(54) STRIPPABLE SYSTEMS BASED ON ACRYLIC BLOCK COPOLYMERS

(75) Inventors: Thilo Dollase, Hamburg (DE); Marc Husemann, Hamburg (DE); Bernd Lühmann, Norderstedt (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/075,482

(22) Filed: Feb. 13, 2002

(65) Prior Publication Data

US 2003/0096075 A1 May 22, 2003

(30) Foreign Application Priority Data

Jun. 20, 2001 (DE) .......................... 101 29 608

(51) Int. Cl.[7] .............................. B32B 33/00
(52) U.S. Cl. ................. 428/40.1; 428/41.3; 428/212; 428/213; 428/214; 428/355; 525/89; 525/94
(58) Field of Search ............... 428/40.1, 41.3, 428/212, 214, 213, 355 R, 355 BL, 355 AC; 525/89, 94

(56) References Cited

U.S. PATENT DOCUMENTS

| | | | |
|---|---|---|---|
| 4,024,312 A | 5/1977 | Korpman | 428/343 |
| 4,581,429 A | 4/1986 | Solomon et al. | 526/220 |
| 5,264,527 A | 11/1993 | Varshney et al. | 525/299 |
| 5,314,962 A | 5/1994 | Otsu et al. | 525/280 |
| 5,403,658 A * | 4/1995 | Southwick | 428/355 |
| 5,672,402 A | 9/1997 | Kreckel et al. | 428/34.2 |
| 5,725,923 A | 3/1998 | Lühmann | 428/40.1 |
| 5,767,210 A | 6/1998 | Lecomte et al. | 526/166 |
| 5,789,487 A | 8/1998 | Matyjaszewski et al. | 525/301 |
| 5,811,500 A | 9/1998 | Dubois et al. | 526/145 |
| 5,854,364 A | 12/1998 | Senninger et al. | 526/192 |
| 5,919,871 A | 7/1999 | Nicol et al. | 525/333.8 |
| 5,945,491 A | 8/1999 | Matyjaszewski et al. | 526/111 |
| 6,069,205 A | 5/2000 | Wang | 525/242 |
| 6,114,482 A | 9/2000 | Senninger et al. | 526/172 |
| 6,479,608 B1 | 11/2002 | Nesvadba et al. | 526/328.5 |
| 6,527,900 B1 * | 3/2003 | Kreckel | 428/343 |

FOREIGN PATENT DOCUMENTS

| | | |
|---|---|---|
| DE | 33 31 061 | 3/1985 |
| DE | 42 33 872 | 3/1994 |
| DE | 43 39 604 | 5/1995 |
| DE | 44 28 587 | 6/1996 |
| DE | 44 31 914 | 10/1996 |
| DE | 195 11 288 | 10/1996 |

(List continued on next page.)

OTHER PUBLICATIONS

DE 196 27 400 Germany.
Specification—U.S. Ser. No. 09/073,509 filed May 6, 1998 English language counterpart to DE 197 20 145.

(List continued on next page.)

*Primary Examiner*—Nasser Ahmad
(74) *Attorney, Agent, or Firm*—Norris McLaughlin & Marcus (57) ABSTRACT

Strippable systems comprising at least one pressure sensitive adhesive based on at least one block copolymer, wherein said at least one block copolymer is based at least in part on (meth)acrylic acid derivatives, the block copolymers containing at least the unit P(A)-P(B)-P(A) composed of at least one polymer block P(B) and at least two polymer blocks P(A), where P(A) independently of one another represent homopolymer or copolymer blocks of monomers A, the polymer blocks P(A) each having a softening temperature in the range from +20° C. to +175° C., P(B) represents a homopolymer or copolymer block of monomers B, the polymer block P(B) having a softening temperature in the range from −100° C. to +10° C., and the polymer blocks P(A) and P(B) are not homogeneously miscible with one another.

25 Claims, 1 Drawing Sheet

FOREIGN PATENT DOCUMENTS

| | | |
|---|---|---|
| DE | 195 31 696 | 3/1997 |
| DE | 197 08 366 | 1/1998 |
| DE | 196 49 727 | 6/1998 |
| DE | 196 49 728 | 6/1998 |
| DE | 196 49 729 | 6/1998 |
| DE | 197 20 145 | 11/1998 |
| DE | 198 20 858 | 11/1999 |
| DE | 42 22 849 | 2/2000 |
| DE | 198 42 864 | 3/2000 |
| DE | 198 42 865 | 3/2000 |
| DE | 199 49 352 | 4/2000 |
| DE | 199 38 693 | 2/2001 |
| EP | 0 735 052 | 10/1996 |
| EP | 0 824 110 | 2/1998 |
| EP | 0 824 111 | 2/1998 |
| EP | 0 826 698 | 3/1998 |
| EP | 0 841 346 | 5/1998 |
| EP | 0 850 957 | 7/1998 |
| EP | 0 921 170 | 6/1999 |
| JP | 11302617 | 11/1999 |
| WO | WO 92/11332 | 7/1992 |
| WO | WO 92/11333 | 7/1992 |
| WO | WO 94/21157 | 9/1994 |
| WO | WO 95/06691 | 3/1995 |
| WO | WO 96/24620 | 8/1996 |
| WO | WO 98/01478 | 1/1998 |
| WO | WO 98/03601 | 1/1998 |
| WO | WO 98/13992 | 4/1998 |
| WO | WO 98/44008 | 10/1998 |
| WO | WO 99/31144 | 6/1999 |
| WO | WO 00/39233 | 7/2000 |

OTHER PUBLICATIONS

Specification—U.S. Ser. No. 08/976,802 filed Nov. 24, 1997 English language counterpart to DE 196 49 728.
Specification—U.S. Ser. No. 09/160,777 filed Sep. 24, 1998 English language counterpart to DE 195 31 696.

* cited by examiner-

STRIPPABLE SYSTEMS BASED ON ACRYLIC BLOCK COPOLYMERS

The invention relates to strippable systems comprising at least one pressure sensitive adhesive based on at least one block copolymer.

For the residueless and nondestructive redetachment of self-adhesive tapes by stretching parallel to their bond plane, very particular requirements are imposed on such self-adhesive tapes (also referred to below as strippable self-adhesive tapes). First, such adhesive tapes must be highly extensible, since it is only the stretching deformation which allows the desired detachment from the substrate. Further, such self-adhesive tapes need high cohesion, so that they do not tear under the tensile stress which is necessary in the detachment process. Of special significance is the requirement that the stretching of the self-adhesive tapes on detachment is accompanied by a significant loss of tack. Only such a loss of tack ensures that the stretched self-adhesive strip during the detachment process does not stick in the stretched state to one of the bond partners in the extended state. Absent such a loss of tack, self-adhesive tapes bonded in this way could in many cases no longer be nondestructively removable from the joint.

BACKGROUND OF THE INVENTION

Self-adhesive tapes redetachable residuelessly and nondestructively by extensive stretching in their bond plane from a wide variety of substrates find broad application in the reversible adhesive sticking of articles which are light to moderately heavy, particularly in the home and office sectors. The strippable self-adhesive tape products described in the patent literature make use of single-layer and multilayer constructions. Single-layer products are described, for example, in DE 33 31 016 A1. The multilayer product constructions can be subdivided into those for which the adhesive strip tensile strength that is required for the residueless and nondestructive detachment process is mediated essentially by a backing sheet or a foam material backing—examples of aforementioned self-adhesive tapes can be found, inter alia, in U.S. Pat. No. 4,024,312, WO 92/11332, WO 92/11333, WO 95/06691, and DE 195 31 696 A1—and those for which the tensile strength is mediated substantially by way of the pressure sensitive adhesive. Examples of the latter products are described, inter alia, in DE 196 49 727 A1, DE 196 49 728 A1, DE 196 49 729 A1, DE 197 20 145 A1, and DE 198 20 858 A1. DE 197 08 366 A1 describes multilayer strippable self-adhesive tapes which are composed of a plurality of layers and comprise styrene block copolymers as base elastomer. Reference below to styrene block copolymers shall be taken to mean the class of materials comprising block copolymers composed of at least one polystyrene block and at least one polydiene block (or a partially or fully hydrogenated analog thereof). As compared with DE 33 31 016 A1, such multilayer construction makes it possible in particular to exert selective control over selected parameters which are significant properties for strippable self-adhesive tapes, such as the stripping force, the adhesion, and also the aging stability with respect, for example, to ozonolysis.

Specific embodiments and applications of aforementioned strippable self-adhesive tapes are described in DE42 22 849A1, DE44 28 587A1, DE44 31 914A1, DE 198 42 864 A1, DE 198 42 865 A1, DE 199 38 693 A1, and WO 98/03601 A1, and also in DE 42 33 872 A1, DE 195 11 288 A1, U.S. Pat. No. 5,672,402 A, and WO 94/21157 A1.

While the patent literature presented above describes a large number of different pressure sensitive adhesive systems examples including those based on natural rubber/resin blends, on styrene block copolymer/resin blends, and on random acrylic copolymers, it is nevertheless the case that commercially available strippable self-adhesive tapes use exclusively pressure sensitive adhesives based on styrene block copolymer/resin blends as, for instance, do the products Command® Adhesive from Minnesota Mining and Manufacturing Co. Inc., St. Paul (USA), the tesa® Powerstrips® from Beiersdorf AG, Hamburg (D), and Plastofix® Formula Force 1000 from Plasto S. A. (F). Apart from the tesa® Powerstrips® Deco, which comprise polymers based on saturated elastomer blocks, these systems use styrene block copolymers based on polymer blocks which are unsaturated in the elastomer block.

Advantages of such styrene block copolymer based pressure sensitive adhesives for use in strippable self-adhesive tapes are:

- their very high extensibility. Elongations at break are generally greater than 400%, preferably greater than 600%, with particular preference greater than 800%.
- the simultaneously very low stress values at moderate degrees of stretching in the range between about 200% and 400% elongation, which, among other things, allow very low detachment forces (stripping forces).
- their tensile strength, which despite high extensibility and low stress values at abovementioned average degrees of stretching is very high and which constitutes an essential prerequisite for the residueless and nondestructive redetachment process, especially if the pressure sensitive adhesive itself contributes to the tensile strength of the self-adhesive tape.
- their ability to exhibit when being stretched a significantly reduced tack, which is an essential prerequisite for an absence of sticking to one of the substrates while in the stretched state during removal from the joint. Self-adhesive strips which do stick in this way on extension can in many cases no longer be removed nondestructively from a joint by further stretching.
- the outstanding bond strengths they can achieve on a variety of substrates having a very wide range of polarities.

Advantages of single-layer strippable self-adhesive tapes based on styrene block copolymers are the simple construction of the product, which is obtainable by a very simple, cost-effective production process; the realization of a wide thickness range; the possibility in principle of producing transparent adhesive tapes, especially tapes with water-clear transparency; and, for the production of punched products, a simple and readily manageable punching process. Advantages of multilayer self-adhesive tapes, consisting of a plurality of styrene block copolymer based layers, are their easy obtainability by coextrusion and the wide variability of layer thicknesses and layer compositions, which allows substantially independent control of surface properties (adhesion) and volume properties (cohesion).

Disadvantages of styrene block copolymer based pressure sensitive adhesives, when using systems which utilize unsaturated polymer chains in the elastomer block, e.g., when using styrene-isoprene-styrene (SIS) and styrene-butadiene-styrene (SBS) block copolymers, include the poor aging stability with respect to ultraviolet radiation and also to thermooxidative degradation and to ozonolysis. Accordingly, it is completely impossible to utilize the advantage of self-adhesive tapes possessing water-clear transparency, because the pressure sensitive adhesive has to be protected from the incidence of light. This is done, for example, by means of light-absorbing additives such as titanium dioxide, whose compounding leads to nontransparent products. It is true that the aging stability of styrene block copolymers containing chemically saturated elastomer blocks, examples being the hydrogenated analogs of SBS and SIS, styrene-ethylene/butylene-styrene (SEBS) and styrene-ethylene/propylene-styrene (SEPS), is much improved, they therefore typically need no light-absorbing additives, and so can be processed more easily to water-clear products. A disadvantage found, however, is typically that the good balance between bond strength and low redetachment forces, which SIS and SBS based pressure sensitive adhesives are known to exhibit, is not achieved. At the same time, in the absence of plasticizers (e.g., liquid resins, aliphatic oils), which are desirable for many formulations, the selection of sufficiently compatible tackifier resins in comparison, say, to SIS is markedly restricted.

A further disadvantage of strippable self-adhesive tapes which utilize styrene block copolymer based pressure sensitive adhesives is that, if the pressure sensitive adhesives are exposed to UV prior to their actual use, they can suffer a marked reduction in achievable bond strengths and, accordingly, a not inconsiderable expense in respect of a UV-impermeable packaging is incurred if the customer is to be guaranteed a uniformly high bonding performance. The above comments apply not only to using styrene block copolymers with elastomer block unsaturation, but also, for example, when using SEBS and SEPS. When bonding to UV-transparent substrates, such as window glass or transparent plastics surfaces, and especially when using styrene block copolymers with elastomer block unsaturation, there exists the additional risk following UV exposure that the detachment forces will rise to such an extent that the adhesive strips cannot be redetached residuelessly and nondestructively, and the adhesive strip tears during the redetachment process.

A further disadvantage of strippable self-adhesive tapes with pressure sensitive adhesives based on styrene block copolymers is the need to blend the styrene block copolymers with components which have a low molecular mass, and are therefore capable of migration, in order to set the desired pressure sensitive adhesion properties. Especially when bonding to sensitive substrates, migration of components in the tackifier resins or migration of plasticizer can result in irreversible changes to the bond substrates: for example, to greasing or instances of discoloration on a wallpaper substrate coated with white emulsion paint. Instances of discoloration may also occur, inter alia, as a result of the use of antioxidants or UV protectants, which are typically used to stabilize such pressure sensitive adhesives and/or even the raw materials of such adhesives.

Partly as a consequence of their saturated polymer backbone, acrylic copolymers possess an excellent aging stability, with respect both to ultraviolet radiation and to thermooxidative aging. At the same time, the pressure sensitive adhesion properties and also specific property features can be controlled within a very wide range by way, for example, of the comonomer composition, the nature and extent of crosslinking and, too, the optional addition of tackifier resins. Their successful use in strippable self-adhesive tapes is therefore particularly attractive.

The use of polyacrylate pressure sensitive adhesives for strippable self-adhesive tapes is described, inter alia, in WO 92/11332 A1, WO 92/11333 A1, WO 95/06691 A1, and DE 195 31 696 A1. The pressure sensitive adhesives set out therein, however, consist of random acrylic copolymers which do not per se offer sufficiently high cohesion to satisfy the requirements. Consequently, adhesive strips based on these adhesives always comprise highly extensible interposed carriers of high tensile strength.

WO 92/11332 A1 describes strippable self-adhesive tapes with an interposed film carrier which use photopolymerized acrylic pressure sensitive adhesives. Polyacrylate pressure sensitive adhesives of this kind and their preparation processes, however, give such products specific disadvantages which have very disruptive consequences in practice. The heat of reaction given off during UV polymerization of an expanse of acrylates can damage the carrier or cause it to undergo corrugation. This applies particularly to double-sided adhesive tapes. The possibility of compounding with, for example, tackifier resins is greatly restricted, since these resins disrupt the UV polymerization. Another disadvantage is the unavoidable crosslinking profile of the adhesive: normally, UV polymerization is accomplished by UV irradiation from the adhesive side. As a result, adhesive films with a higher level of crosslinking at the adhesive surface than toward the carrier are obtained. The consequences are a reduced tack and poor anchoring of the adhesive. If exposure to ultraviolet light is to take place through the carrier, which results in improved tack, adhesion, and adhesive anchoring, the carrier must be UV permeable. Many carriers, however, are not particularly UV permeable or are damaged by UV light. Overall, therefore, the product properties are such that prolonged bonding in consistent quality is not ensured: this is demonstrated in WO 92/11332 A1 on page 19, table 2, column 6, by the residues of adhesive which remain at the edges of the bond (footnote a), if the products do not tear anyway (footnote b).

WO 92/11333 A1, WO 95/06691 A1, and DE 195 31 696 A1 describe strippable self-adhesive tapes which utilize a broad combination of conventional acrylic copolymers possessing pressure sensitive adhesion. Described inter alia are radiation-chemically crosslinkable acrylic copolymers or those which, for example, utilize heat-initiated crosslinking mechanisms. A disadvantage of all of the examples set out is the need for chemical crosslinking or radiation-chemical crosslinking in order to generate sufficient cohesion in the pressure sensitive adhesives. Despite crosslinking, however, acrylic pressure sensitive adhesives of this kind exhibit tensile stress/elongation characteristics which are very disadvantageous for a strippable self-adhesive tape, and, consequently, low tensile strengths, with corresponding disadvantages for a tearfree detachment process, necessitating the use of a backing layer. A further disadvantage is a marked permanent deformation of the abovementioned pressure sensitive adhesives at high stretch, i.e., flow of the pressure sensitive adhesive film at high deformations. Such high deformations automatically occur, however, during the process of detachment by extensive stretching. The aforementioned tensile stress/elongation characteristics of such pressure sensitive adhesives may be the essential reason for the low loss of tack on stretching which is observed in acrylic adhesives and also for the high detachment forces (stripping forces) in comparison to styrene block copolymer pressure sensitive adhesives, since a correspondingly greater amount of the energy consumed in the detachment process is dissipated irreversibly in the adhesive.

Acrylic polymers obtained by UV-induced polymerization (see, for example, WO 92/11332 A1) or crosslinked by means of UV radiation (see, for example, UV-acResin®, BASF®), typically cannot be processed to layers with a thickness of more than 100 $\mu$m, since above such thicknesses the intensity of the penetrating UV radiation is no longer sufficient for crosslinking.

A generally critical disadvantage of the use of acrylic copolymers as strippable self-adhesive tapes are their specific tensile stress/elongation characteristics, typically characterized by low tensile strengths. Particularly under high stretch, they commonly exhibit a much lower resilience than styrene block copolymer based pressure sensitive adhesives. At the same time, stretching of acrylic copolymer based pressure sensitive adhesives of this kind is observed to be accompanied by a much lower loss of tack than in the case of styrene block copolymer based pressure sensitive adhesives (see Examples).

Such a lower loss of tack, however, has been found from experience to cause significant impairment to the detachment properties. This applies in particular to double-sided pressure-sensitively self-adhesive tapes: it is virtually impossible during practical detachment to avoid contact between the adhesive strip to be removed from the joint and one of the substrate surfaces. If, however, such double-sided self-adhesive strips stick to one of the substrates in the extended state, as a result of their high tack even in the extended state during removal from the joint, then it is in many cases no longer possible to remove them from the joint; instead, they tear during the attempt to stretch them further. Likewise, self-adhesive strips with only a low loss of tack on stretching exhibit high frictional forces on contact with their substrate surfaces, which can lead to entry cracks in the adhesive surface and, subsequently, to tearing of the self-adhesive strips.

Because of their high aging stability and the option to manage without migratable adhesive components of low molecular mass, strippable self-adhesive tapes featuring pressure sensitive adhesives based on acrylic copolymers are of particular interest for use in reusable strippable self-adhesive strips. DE 195 31 696 A1 describes strippable adhesive strips comprising an elastic, styrene block copolymer core to either side of which pressure-sensitively adhesive, acrylate-containing outer layers have been laminated. However, it is found for such systems that the loss of tack on stretching is too low to give strippable self-adhesive strips which can be detached from the substrate residuelessly and nondestructively. Whether the acrylate-containing outer layer is uncrosslinked or crosslinked chemically is immaterial, since in both cases the tensile stress/elongation characteristics of the outer layer differ unfavorably from those of the middle layer.

Aging stability and high water resistance, in contrast, are the classic advantages of pressure sensitive adhesives based on acrylate. Pressure sensitive adhesive tapes of high bond strength can be produced by targeted copolymerization with different acrylates. Absent crosslinking, however, the cohesion of such adhesives is too low. Accordingly, polyacrylates are crosslinked chemically in order to ensure a certain minimum cohesion (WO 92/11332 A1).

Through the changeover to hotmelt processes, which are used to produce pressure sensitive adhesives on account, inter alia, of the fact that they permit realization of high film thicknesses, some of the crosslinking mechanisms employed to date for polyacrylate pressure sensitive adhesives become superfluous. For example, thermal crosslinking techniques with metal chelates or polyfunctional isocyanates, which are very widespread with the solvent systems, can no longer be employed. At present, therefore, the crosslinking of polyacrylate pressure sensitive adhesives by exposure to ultraviolet light (UV) or to electron beams (EB) is being forced forward, the latter being known as electron beam curing (EBC). These two crosslinking methods, however, are not without their disadvantages. For instance, electron beams cause partial or complete destruction to the backings of the pressure sensitive adhesive tapes, and UV crosslinking is possible only up to a film thickness of 100 μm, particularly with resin-blended systems. Moreover, EBC is efficient, with no loss in tack, only for polymers of high average molar mass.

Acrylate-containing block copolymers elegantly combine the advantageous properties of conventional acrylic copolymers (aging stability, water-clear transparency, inherent pressure-sensitive adhesion) and styrene block copolymers (thermoreversible physical crosslinking, high cohesion). Various synthetic approaches have been described for realizing such systems. U.S. Pat. No. 5,314,962 A describes a photoinitiated INIFERTER process (an additive-controlled radical polymerization method; cf. also T. Otsu, Journal of Polymer Science A Polymer Chemistry, 2000, 38, 2121); U.S. Pat. No. 5,264,527 A and JP 11302617 A1 describe a preparation by anionic polymerization; EP 824 110 A1 and U.S. Pat. No. 6,069,205 A describe processes based on ATRP (atom transfer radical polymerization); EP 921 170 A1 describes a radical polymerization process controlled by stable nitroxide radicals; WO 98/01478 A1 describes a further polymerization method operating by a controlled radical mechanism (RAFT, reversible addition-fragmentation chain transfer); these processes are mentioned here by way of example (K. Matyjaszewski (ed.), Controlled/Living Radical Polymerization, ACS Symposium Series 768, 2000, ACS, Washington D.C.). Some of the studies cited propose the use of acrylic block copolymers as elastomers for pressure sensitive adhesives. The cohesion needed for pressure sensitive adhesives is achieved in the acrylic block copolymers by domain formation in the endblocks, which have a softening temperature situated well above room temperature. Since, however, this domain formation is thermoreversible, such materials can be processed as hotmelts (EP 921 170 A1, WO 00/39233 A1).

In WO 00/39233 A1, block copolymers are prepared and processed as hotmelt pressure sensitive adhesives, and self-adhesive tape products are produced from them. The invention embraces block copolymers composed of at least two A blocks and one B block, the block copolymer being blended with at least 40% resin. As a result of this high resin fraction, however, the glass transition temperature of the polymer is sharply raised, so that these materials are very hard and, consequently, have low bond strengths and require high deformation forces for stretching, for example, and so are unsuited to use as strippable products.

The tensile stress/elongation characteristics of acrylate-containing block copolymers has likewise been investigated (cf., e.g., G. Holden, N. R. Legge, R. Quirk, H. E. Schroeder (ed.), Thermoplastic Elastomers, 2nd ed., 1996, C. Hanser Verlag, Munich, or Macromolecules 1995, 28, 7886).

To date, however, no acrylate-containing block copolymers have been found which can be processed in strippable self-adhesive strips as, or as an ingredient of, a pressure sensitive adhesive. In particular, no loss of tack under stretch has been described for pressure sensitive adhesives containing acrylic block copolymer.

It is therefore an object of this invention to provide improved strippable systems which exhibit the disadvantages of the prior art to a reduced extent, if at all, and which in particular possess high stability to exposure to light, particularly UV radiation, and to thermooxidative degradation and ozonolysis, exhibit distinct tack losses under stretch, and therefore guarantee reliable detachment by extensive stretching.

SUMMARY OF THE INVENTION

Surprisingly, and unforeseeably for the skilled worker, this object is achieved by the strippable systems of the invention such as they are depicted in the main claim and in the subclaims. A feature of these strippable systems are that they are based on a pressure sensitive adhesive, based in turn on acrylic block copolymers, which meets the abovementioned specifications and is notable in particular for the following criteria:

- possibility of using a large number of monomers for synthesizing the pressure sensitive adhesive, so that a broad palette of pressure sensitive adhesion properties can be set by means of the chemical composition;
- frequent reusability of the strippable system,
- low stress values in the range of moderate elongations from about 200% to 400%, and hence ready redetachment by extensive stretching in the bond plane;
- enablement of the preparation of thick, highly cohesive pressure sensitive adhesive films, as needed, inter alia, for the production of single-layer strippable self-adhesive tapes;
- possibility of choice in the use of comonomers, which permits the thermal stability to be controlled and, in particular, a persistently good cohesion and thus holding power at high temperatures (>+60° C.).

DETAILED DESCRIPTION

The strippable systems of the invention based on acrylic block copolymer pressure sensitive adhesives that are provided by this invention possess, surprisingly, a loss of tack under stretch that is essential for residueless and nondestructive detachment. Using the acrylate-containing block copolymers described below as a basis for strippable systems of this kind, it was possible to produce self-adhesive tapes which can be redetached residuelessly and nondestructively by stretching parallel to the bond surface.

Here and below, strippable systems are single-sidedly or double-sidedly pressure-sensitively self-adhesive sheets and strips which are used for fixing on a material or for fixing two materials to one another and for which the bond can be redetached residuelessly and nondestructively by extensive stretching of the self-adhesive strip substantially in its bond plane.

The main claim relates, accordingly, to strippable systems which comprise at least one pressure sensitive adhesive based on at least one block copolymer.

Said at least one block copolymer is based at least in part on (meth)acrylic acid derivatives, the block copolymers containing at least the unit P(A)-P(B)-P(A) composed of at least one polymer block P(B) and at least two polymer blocks P(A) spatially separate from one another, where P(A) independently of one another represent homopolymer or copolymer blocks of monomers A, the polymer blocks P(A) each having a softening temperature in the range from +20° C. to +175° C., P(B) represents a homopolymer or copolymer block of monomers B, the polymer block P(B) having a softening temperature in the range from −100° C. to +10° C., and the polymer blocks P(A) and P(B) are not homogeneously miscible with one another.

In what follows, the polymer blocks P(A) are also referred to as "hard" blocks and the polymer blocks P(B) as "elastomer" blocks.

The softening temperature in this context is the glass transition temperature in the case of amorphous systems and the melting temperature in the case of semicrystalline polymers. Glass temperatures are reported as results of quasistatic methods such as differential scanning calorimetry (DSC), for example.

The block copolymers used for the strippable systems of the invention are distinguished, therefore, by the presence of two spatially separate polymer blocks P(A), such spatial separation being realized by a polymer block P(B); in order to develop physical crosslinking, therefore, the block copolymers must contain the block sequence P(A)-P(B)-P(A). By initiating the synthesis reaction, effectuating it, or other processes, initiator molecules or other alien molecular fractions can be incorporated into the block sequence P(A)-P(B)-P(A) (or are also located at the ends of the copolymer blocks). To this extent, the notation adopted here represents a simplified form.

It is of particular advantage for the strippable systems of the invention if the pressure sensitive adhesive has an elongation at break of at least 300% and a tensile strength of at least 3 MPa. These values are measured in accordance with the test methods B indicated in the experimental section.

In accordance with the comments made above, the block copolymers for the pressure sensitive adhesive of the invention can be prepared and used to advantage in a wide variety of structures. Explicit reference may be made to linear or branched chains comprising the polymer blocks P(A) and P(B), or to star-shaped block copolymers which contain at least two spatially separate polymer blocks P(A) corresponding to the above embodiments.

Strippable systems particularly advantageous in the sense of the invention are those wherein the construction of the block copolymer (copolymers) can be described by one or more of the following general formulae:

P(A)-P(B)-P(A)  (I)

P(B)-P(A)-P(B)-P(A)-P(B)  (II)

[P(A)-P(B)]$_n$X  (III)

[P(B)-P(A)-P(B)]$_n$X  (IV)

[P(A)-P(B)]$_n$X[P(B)]$_m$  (V), wherein n is greater than or equal to 2 (preferably n=2 to 12), m>0 (preferably m=1 to 12), and X represents a polyfunctional branching unit, i.e., a chemical building block via which different polymer arms are linked to one another, wherein the polymer blocks P(A) independently of one another represent homopolymer or copolymer blocks of the monomers A, the polymer blocks P(A) each having a softening temperature in the range from +20° C. to +175° C.; and wherein the polymer blocks P(B) independently of one another represent homopolymer or copolymer blocks of the monomers B, polymer blocks P(B) each having a softening temperature in the range from −100° C. to +10° C.

The polyfunctional branching unit X can be a single bond [accordingly, the compound (III) with X as a covalent bond and n=2 is the compound P(A)-P(B)-P(A) (I)]. The compound (II) is given, correspondingly, by (IV) with X as a covalent bond and n=2. With advantage, it is likewise possible to use the block copolymer corresponding to P(B)-P(A)-P(B)-P(A).

The polymer blocks P(A) as described in the main claim or in the advantageous embodiments can comprise polymer chains of a single monomer type from group A, or copolymers of monomers of different structures from group A. In particular, the monomers A used can vary in their chemical structure and/or in the length of the alkyl radical. The polymer blocks therefore span the range between completely homogeneous polymers, via polymers composed of monomers of identical chemical parent structure but differing in chain length, and those with the same number of carbons but different isomerism, through to randomly polymerized blocks composed of monomers of different length with different isomerism from group A. The same applies to the polymer blocks P(B) in respect of the monomers from group B. The unit P(A)-P(B)-P(A) may be either symmetrical [corresponding to $P^1(A)$-P(B)-$P^2(A)$ where $P^1(A)=P^2(A)$] or asymmetric [corresponding, for instance, to the formula $P^3(A)$-P(B)-$P^4(A)$ where $P^3(A)$ $P^4(A)$, but where both $P^3(A)$ and $P^4(A)$ are each polymer blocks as defined for P(A)] in construction. An advantageous configuration is one in which the block copolymers have a symmetrical construction such that there are polymer blocks P(A) identical in chain length and/or chemical structure and/or there are polymer blocks P(B) identical in chain length and/or chemical structure. Also included, however, are all "asymmetric" structures wherein all of the polymer blocks P(A) and P(B) per se meet the abovementioned criteria without the individual building blocks necessarily having chemical or structural identity.

As monomers for the elastomer block P(B) it is advantageous to use acrylic monomers. For this it is possible in principle to use all acrylic compounds which are familiar to the skilled worker and suitable for synthesizing polymers. It is preferred to choose monomers which, even in combination with one or more further monomers, produce polymer block P(B) glass transition temperatures of less than +10° C. Accordingly, it is possible with preference to choose the vinyl monomers.

The polymer blocks P(B) are advantageously prepared using from 75 to 100% by weight of acrylic and/or methacrylic acid derivatives of the general structure $$CH_2=CH(R^1)(COOR^2) \quad (VI)$$

where $R^1$=H or $CH_3$ and $R^2$=H or linear, branched or cyclic, saturated or unsaturated alkyl radicals having from 1 to 30, in particular from 4 to 18, carbon atoms and from 0 to 25% by weight of vinyl compounds (VII) which in favorable cases contain functional groups.

Acrylic monomers used with great preference in compound (VI) as components for polymer blocks P(B) comprise acrylic and methacrylic alkyl esters having alkyl groups composed of from 4 to 9 carbon atoms. Specific examples of such compounds, without wishing to be restricted by this enumeration, include n-butyl acrylate, n-pentyl acrylate, n-hexyl acrylate, n-heptyl acrylate, n-octyl acrylate, n-nonyl acrylate, branched isomers thereof, such as 2-ethylhexyl acrylate and isooctyl acrylate, for example, and also cyclic monomers such as cyclohexyl acrylate or norbornyl acrylate and isonorbornyl acrylate, for example.

As an option, it is also possible to use vinyl monomers from the following groups as monomers defined as (VII) for polymer blocks P(B): vinyl esters, vinyl ethers, vinyl halides, vinylidene halides, and also vinyl compounds which comprise aromatic cycles and heterocycles in a position. Here too, mention may be made, by way of example, of selected monomers which can be used in accordance with the invention: vinyl acetate, vinylformamide, vinylpyridine, ethyl vinyl ether, 2-ethylhexyl vinyl ether, butyl vinyl ether, vinyl chloride, vinylidene chloride, and acrylonitrile.

A further preferred possibility is to use macromonomers, if it is desired to incorporate polymer sidechains and a graft process is unsuitable for doing so. By way of example, mention may be made here of homopolymers or copolymers or homooligomers or cooligomers which are composed of monomers of type B and carry a polymerizable unit such as a methacrylic, acrylic or vinyl group, for example, at at least one position, preferably at the chain end. It is, however, also possible to employ other polymer chains with corresponding functionalization, such as polydienes.

Particularly preferred examples of suitable vinyl-containing monomers (VII) of the elastomer block P(B) further include hydroxyethyl acrylate, hydroxypropyl acrylate, hydroxyethyl methacrylate, hydroxypropyl methacrylate, N-methylolacrylamide, acrylic acid, methacrylic acid, allyl alcohol, maleic anhydride, itaconic anhydride, itaconic acid, benzoin acrylate, acrylated benzophenone, acrylamide, and glycidyl methacrylate, to name but a few.

In one preferred embodiment of the inventive strippable systems, one or more of the polymer blocks contains one or more grafted-on side chains. Systems of this kind can be obtained both by a graft-from process (polymerizational attachment of a sidechain starting from an existing polymer backbone) and by a graft-to process (attachment of polymer chains to a polymer backbone by means of polymer-analogous reactions). For preparing sidechain block copolymers of this type it is possible in particular to use, as monomers B, monomers functionalized in such a way as to allow a graft-from process for the grafting on of sidechains. Particular mention here is to be made of acrylic and methacrylic monomers which carry halogen functionalization or functionalization provided by any other functional groups which permit, for example, an ATRP (atom transfer radical polymerization) process. Alternatively, the polymer backbone may be prepared using macrocomonomers: that is, polymer chains functionalized with a polymerizable unit.

In one specific embodiment of this invention, the polymer blocks P(B) have had incorporated into them one or more functional groups which permit radiation-chemical crosslinking of the polymer blocks, in particular by means of UV radiation or irradiation with rapid electrons. With this objective, monomer units which can be used include, in particular, acrylic esters containing an unsaturated alkyl radical having from 3 to 18 carbon atoms and at least one carbon-carbon double bond. Suitable acrylates modified with double bonds include, with particular advantage, allyl acrylate and acrylated cinnamates. In addition to acrylic monomers it is also possible with great advantage, as monomers for the polymer block P(B), to use vinyl compounds containing double bonds which are not reactive during the (radical) polymerization of the polymer block P(B). Particularly preferred examples of such comonomers are isoprene and/or butadiene, and also chloroprene.

Starting monomers for the polymer blocks P(A) are preferably selected such that the resulting polymer blocks P(A) are immiscible with the polymer blocks P(B) and, correspondingly, microphase separation occurs. Advantageous examples of compounds used as monomers A include vinylaromatics, methyl methacrylate, cyclohexyl methacrylate, and isobornyl methacrylate. Particularly preferred examples are methyl methacrylate and styrene, although this enumeration makes no claim to completeness.

In addition, however, the polymer blocks P(A) may also be constructed in the form of a copolymer which can consist of at least 75% of the above monomers A, leading to a high softening temperature, or of a mixture of these monomers, but contains up to 25% of monomers B which result in a reduction in the softening temperature of the polymer block P(A). In this sense mention may be made, by way of example but not exclusively, of alkyl acrylates, which are defined in accordance with the structure (VI) and the comments made in relation thereto.

In another favorable embodiment of the inventive strippable systems, polymer blocks P(A) and/or P(B) are functionalized in such a way that a thermally initiated crosslinking can be accomplished. Crosslinkers which can be chosen favorably include epoxides, aziridines, isocyanates, polycarbodiimides, and metal chelates, to name but a few.

One preferred characteristic of the block copolymers is that their molar mass $M_n$ is between about 10 000 and about 600 000 g/mol, preferably between 30 000 and 400 000 g/mol, with particular preference between 50 000 g/mol and 300 000 g/mol. The fraction of the polymer blocks P(A) is advantageously between 5 and 40 percent by weight of the overall block copolymer, preferably between 7.5 and 35 percent by weight, with particular preference between 10 and 30 percent by weight. The polydispersity of the block copolymer is preferably less than 3, being the quotient formed from the mass average $M_w$ and the number average $M_n$ of the molar mass distribution. The ratios of the chain lengths of the block copolymers P(A) to those of the block copolymers P(B) are chosen, in a very advantageous way, such that the block copolymers P(A) are present in the form of a disperse phase ("domains") in a continuous matrix of the polymer blocks P(B). This is preferably the case at a polymer block P(A) content of less than about 25% by weight. The formation of hexagonally packed cylindrical domains of the polymer blocks P(A) is likewise possible within the inventive teaching, but is normally not very preferential, owing to the relatively unadvantageous tensile stress/elongation characteristics of such materials and the structural anisotropy induced by the domain structure in the resulting pressure sensitive adhesives. By an asymmetric design of the triblock copolymers, in which the block lengths of the terminal polymer blocks P(A) in linear systems are different, it is possible to raise the polymer block P(A) content at which the system still develops a spherical morphology to more than about 30% by weight. This is particularly preferred if it is necessary to increase the internal strength of the pressure sensitive adhesive, and also for improving the mechanical properties.

Furthermore, it has been found inventively advantageous to use blends of the abovementioned block copolymers containing at least one unit P(A)-P(B)-P(A) with block copolymers which do not contain two polymer blocks P(A) separated by a block P(B); for example, having the inversely constructed block copolymers P(B)-P(A)-P(B), $[P(B)-P(A)]_nX$ and/or $[P(B)-P(A)]_nX[P(B)]_m$.

Particularly suitable blend components are the diblock copolymers P(A)-P(B), it being possible in the aforementioned cases to use the same monomers as above to prepare the corresponding polymer blocks P(A) and P(B). Moreover, it can be of advantage to add polymers P'(A) and/or P'(B) to the aforementioned block copolymer blends in order to improve their properties. Accordingly, a further development of the strippable systems is represented by those systems wherein the pressure sensitive adhesive comprises a blend of one or more block copolymers with at least one block copolymer which contains the inversely constructed unit P(B)-P(A)-P(B), and/or containing one or more diblock copolymers P(A)-P(B)

wherein the polymer blocks P(A) (of the individual inverse block copolymres and/or of the diblock copolymers) independently of one another represent homopolymer or copolymer blocks of monomers A, the polymer blocks P(A) each having a softening temperature in the range from +20° C. to +175° C., and wherein the polymer blocks P(B) (of the individual inverse block copolymers and/or the diblock copolymers) independently of one another represent homopolymer or copolymer blocks of monomers B, the polymer blocks P(B) each having a softening temperature in the range from −100° C. to +10° C., and/or containing polymers P'(A) and/or P'(B), wherein the polymers P'(A) represent homopolymers and/or copolymers of the monomers A, the polymers P'(A) each having a softening temperature in the range from +20° C. to +175° C., wherein the polymers P'(B) represent homopolymers and/or copolymers of the monomers B, the polymers P'(B) each having a softening temperature in the range from −100° C. to +10° C., and wherein the polymers P'(A) and/or P'(B) are preferably miscible with the polymer blocks P(A) and/or P(B), respectively.

Where both polymers P'(A) and polymers P'(B) are admixed, they are advantageously chosen such that the polymers P'(A) and P'(B) are not homogeneously miscible with one another.

As monomers for the inverse block copolymers, the diblock copolymers P(A)-P(B), and, respectively, the polymers P'(A) and P'(B) it is preferred to use the monomers already mentioned of groups A and B.

The diblock copolymers preferably have a molar mass $M_n$ of between 5 000 and 600 000 g/mol, more preferably between 15 000 and 400 000 g/mol, with particular preference between 30 000 and 300 000 g/mol. They advantageously possess a polydispersity $D=M_w/M_n$ of not more than 3. It is advantageous if the fraction of the polymer blocks P(A) in relation to the composition of the diblock copolymer is between 3 and 50% by weight, preferably between 5 and 35% by weight.

Typical concentrations in which inverse block copolymers and/or diblock copolymers are used in the blend are up to 250 parts by weight per 100 parts by weight of block copolymers containing the unit P(A)-P(B)-P(A). The polymers P'(A) and, respectively, P'(B) may be of homopolymer or else copolymer construction. In accordance with the comments made above, they are advantageously chosen so as to be compatible with the block copolymers P(A) and, respectively, P(B). The chain length of the polymers P'(A) and P'(B), respectively, is preferably chosen so that it does not exceed that of the polymer block which is preferably miscible and/or associable with it, and is preferably 10% lower, very advantageously 20% lower, than said length.

In one advantageous procedure, the polymer blocks P(B) of the inverse block copolymers or of the diblock copolymers and/or the polymers P'(B) also contain, at least in part, one or more grafted-on side chains. Here again, it is possible to utilize graft-from and graft-to processes for the preparation. The comments made above in this respect apply likewise. Inverse block copolymers, diblock copolymers P(A)-P(B) and/or polymers P'(B) modified in this way are particularly suitable in cases of introducing grafted-on sidechains into the pressure sensitive adhesive system when it is not possible to provide the copolymer blocks containing the unit P(A)-P(B)-P(A) directly with sidechains.

To prepare the block copolymers for the strippable systems of the invention it is possible in principle to use all polymerizations which proceed in accordance with a controlled or living mechanism, including combinations of different controlled polymerization techniques. Without possessing any claim to completeness, mention may be made here, by way of example, besides anionic polymerization, of ATRP, nitroxide/TEMPO-controlled polymerization, or, more preferably, the RAFT process; in other words, particularly processes which allow control over the block lengths, polymer architecture, or else, but not necessarily, the tacticity of the polymer chain.

Radical polymerizations can be conducted in the presence of an organic solvent or in the presence of water or in mixtures of organic solvents and/or organic solvents with water, or without solvent. It is preferred to use as little solvent as possible. Depending on conversion and temperature, the polymerization time for radical processes is typically between 6 and 72 h.

In the case of solution polymerization, the solvents used are preferably esters of saturated carboxylic acids (such as ethyl acetate), aliphatic hydrocarbons (such as n-hexane, n-heptane or cyclohexane), ketones (such as acetone or methyl ethyl ketone), special boiling point spirit, aromatic solvents such as toluene or xylene, or mixtures of the aforementioned solvents. For polymerization in aqueous media or in mixtures of organic and aqueous solvents, it is preferred to add emulsifiers and stabilizers for the polymerization. As polymerization initiators it is of advantage to use customary radical-forming compounds such as, for example, peroxides, azo compounds, and peroxosulfates. Initiator mixtures also possess outstanding suitability.

In an advantageous procedure, radical stabilization is effected using nitroxides of type (VIIIa) or (VIIIb):

where $R^3$, $R^4$, $R^5$, $R^6$, $R^7$, $R^8$, $R^9$, and $R^{10}$ independently of one another denote the following compounds or atoms:

i) halides, such as chlorine, bromine or iodine
ii) linear, branched, cyclic, and heterocyclic hydrocarbons having from 1 to 20 carbon atoms, which can be saturated, unsaturated or aromatic,
iii) esters —$COOR^{11}$, alkoxides —$OR^{12}$ and/or phosphonates —$PO(OR^{13})_2$, in which $R^{11}$, $R^{12}$, and $R^{13}$ stand for radicals from group ii).

Compounds of formula (VIIIa) or (VIIIb) may also be attached to polymer chains of any kind (primarily in the sense that at least one of the abovementioned radicals constitutes such a polymer chain) and can therefore be used as macroradicals or macroregulators to construct the block copolymers.

More preferred as controlled regulators for the polymerization are compounds of the following type:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl)1-diethylphosphono-1-methylethyl nitroxide di-t-butyl nitroxide diphenyl nitroxide t-butyl t-amyl nitroxide U.S. Pat. No. 4,581,429 A discloses a controlled-growth radical polymerization process initiated using a compound of the formula R'R"N-O-Y in which Y is a free radical species which is able to polymerize unsaturated monomers. The reactions, however, generally have low conversions. The particular problem is the polymerization of acrylates, which proceeds only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process using very specific radical compounds such as, for example, phosphorus-containing nitroxides which are based on imidazolidine. WO 98/44008 A1 discloses specific nitroxyls based on morpholines, piperazinones, and piperazinediones. DE 199 49 352 A1 describes heterocyclic alkoxyamines as regulators in controlled-growth radical polymerizations. Corresponding further developments of the alkoxyamines and/or of the corresponding free nitroxides improve the efficiency for preparing polyacrylates (Hawker, contribution to the National Meeting of the American Chemical Society, Spring 1997; Husemann, contribution to the IUPAC World Polymer Meeting 1998, Gold Coast).

As a further controlled polymerization method, it is possible advantageously to use atom transfer radical polymerization (ATRP) to synthesize the block copolymers, with preferably monofunctional or difunctional secondary or tertiary halides being used as initiator and, to abstract the halide(s), complexes of Cu, Ni, Fe, Pd, Pt, Ru, Os, Rh, Co, Ir, Ag or Au (EP0 824 111 A1; EP 826 698A1; EP824 110A1; EP 841346 A1; EP 850 957 A1). The different possibilities of ATRP are also described in the documents U.S. Pat. Nos. 5,945,491 A, 5,854,364 A, and 5,789,487 A.

It is also possible with advantage to prepare the block copolymer used in accordance with the invention by means of an anionic polymerization. In this case the reaction medium used preferably comprises inert solvents, such as aliphatic and cycloaliphatic hydrocarbons, for example, or else aromatic hydrocarbons.

The living polymer is generally represented by the structure $P_L(A)$-Me, in which Me is a metal from group I of the Periodic Table, such as lithium, sodium or potassium, for example, and $P_L(A)$ is a growing polymer block made up of the monomers A. The molar mass of the polymer block being prepared is determined by the ratio of initiator concentration to monomer concentration. In order to construct the block structure, first of all the monomers A are added for the construction of a polymer block P(A), then, by adding the monomers B, a polymer block P(B) is attached, and subsequently, by again adding monomers A, a further polymer block P(A) is polymerized on, so as to form a triblock copolymer P(A)-P(B)-P(A). Alternatively, P(A)-P(B)-M can be coupled by means of a suitable difunctional compound. In this way, starblock copolymers [(P(B)-P(A))$_n$]X as well are obtainable. Examples of suitable polymerization initiators include n-propyllithium, n-butyllithium, sec-butyllithium, 2-naphthyllithium, cyclohexyllithium, and octyllithium, but this enumeration makes no claim to completeness. Furthermore, initiators based on samarium complexes are known for the polymerization of acrylates (Macromolecules, 1995, 28, 7886) and can be used here.

It is also possible, moreover, to use difunctional initiators, such as 1,1,4,4-tetraphenyl-1,4-dilithiobutane or 1,1,4,4-tetraphenyl-1,4-dilithioisobutane. Coinitiators may likewise be used. Suitable coinitiators include lithium halides, alkali metal alkoxides, and alkylaluminum compounds. In one very preferred version, the ligands and coinitiators are chosen so that acrylate monomers, such as n-butyl acrylate and 2-ethylhexyl acrylate, for example, can be polymerized directly and do not have to be generated in the polymer by transesterification with the corresponding alcohol.

A very preferred preparation process conducted is a variant of the RAFT polymerization (reversible addition-fragmentation chain transfer polymerization). The polymerization process is described in detail, for example, in the documents WO 98/01478 A1 and WO 99/31144 A1. Suitable with particular advantage for the preparation of triblock copolymers are trithiocarbonates of the general structure R$^{III}$—S—C(S)—S—R$^{III}$ (Macro-molecules 2000, 33, 243–245), by means of which, in a first step, monomers for the endblocks P(A) are polymerized. Then, in a second step, the middle block P(B) is synthesized. Following the polymerization of the endblocks P(A), the reaction can be terminated and reinitiated. It is also possible to carry out polymerization sequentially without interrupting the reaction. In one very advantageous variant, for example, the trithiocarbonates (IX) and (XI) are used for the polymerization, it being possible for Φ to be a phenyl ring, which can be unfunctionalized or functionalized by alkyl or aryl substituents attached directly or via ester or ether bridges, or to be a cyano group. The phenyl ring φ may optionally carry one or more polymer blocks, examples being polybutadiene, polyisoprene, polychloroprene or poly (meth)acrylate, which can be constructed in accordance with the definition of P(A) or P(B), or polystyrene, to name but a few. Functionalizations may, for example, be halogens, hydroxyl groups, epoxide groups, groups containing nitrogen or sulfur, with this list making no claim to completeness.

(IX)

(X)

It is also possible to employ thioesters of the general structure R$^{IV}$—C(S)—S—R$^{V}$, especially in order to prepare asymmetric systems. R$^{IV}$ and R$^{V}$ can be selected independently of one another, and R$^{IV}$ can be a radical from one of the following groups i) to iv) and R$^{V}$ a radical from one of the following groups i) to iii):

i) $C_1$ to $C_{18}$ alkyl, $C_2$ to $C_{18}$ alkenyl, $C_2$ to $C_{18}$ alkynyl, each linear or branched; aryl-, phenyl-, benzyl-, aliphatic and aromatic heterocycles.

ii) —NH$_2$, —NH—R$^{VI}$, —NR$^{VI}$R$^{VII}$, —NH—C(O)—R$^{VI}$, —NR$^{VI}$—C(O)—R$^{VII}$, —NH—C(S)—R$^{VI}$, —NR$^{VI}$—C(S)—R$^{VII}$, with R$^{VI}$ and R$^{VII}$ being radicals selected independently of one another from group i).

iii) —S—R$^{VIII}$, —S—C(S)—R$^{VIII}$, with R$^{VIII}$ being able to be a radical from one of groups i) or ii).

iv) —O—R$^{VIII}$, —O—C(O)—R$^{VIII}$, with R$^{VIII}$ being able to be a radical chosen from one of the groups i) or ii).

In connection with the abovementioned polymerizations which proceed by controlled radical mechanisms, it is preferred to use initiator systems which further comprise additional radical initiators for the polymerization, especially thermally decomposing radical-forming azo or peroxo initiators. In principle, however, all customary initiators known for acrylates are suitable for this purpose. The production of C-centered radicals is described in Houben-Weyl, Methoden der Organischen Chemie, Vol. E19a, p. 60 ff. These methods are employed preferentially. Examples of radical sources are peroxides, hydroperoxides, and azocompounds. A few non-exclusive examples of typical radical initiators that may be mentioned here include potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate, and benzpinacol. In one very preferred variant, the radical initiator used is 1,1'-azobis (cyclohexylnitrile) (Vazo 88®, DuPont®) or 2,2-azobis(2-methylbutanenitrile) (Vazo 67®, DuPont®). Furthermore, it is also possible to use radical sources which release radicals only under UV radiation.

In the conventional RAFT process, polymerization is generally carried out only to low conversions (WO 98/01478 A1), in order to obtain very narrow molecular weight distributions. Because of the low conversions, however, these polymers cannot be used as pressure sensitive adhesives and particularly not as hotmelt pressure sensitive adhesives, since the high residual monomer fraction adversely affects the adhesive technological properties, the residual monomers contaminate the solvent recyclate in the concentration process, and the corresponding self-adhesive tapes will exhibit very high outgassing. In order to circumvent this drawback of low conversions, in one particularly preferred form the polymerization is initiated multiply. This innovation is part of the present specification.

In accordance with the invention, therefore, the solvent is stripped off preferably in a concentrative extruder under reduced pressure, it being possible to use, for example, single-screw or twin-screw extruders for this purpose, which preferentially distill off the solvent in different or the same vacuum stages and which possess a feed preheater.

Customary amounts of block copolymers or blends thereof in the pressure sensitive adhesive may amount, for example, to more than 25% by weight, preferably more than 50% by weight, based on the weight of the adhesive. The mixing ratio with further components is chosen as a function of the desired properties.

For advantageous further developments, tackifier resins may be admixed to the block copolymer pressure sensitive adhesives. In principle, it is possible to use all resins soluble in the corresponding polyacrylate middle block P(B). Suitable tackifier resins include rosin and rosin derivatives (rosin esters, including rosin derivatives stabilized by, for example, disproportionation or hydrogenation) polyterpene resins, terpene-phenolic resins, alkylphenol resins, and aliphatic, aromatic and aliphatic-aromatic hydrocarbon resins, to name but a few. Primarily, the resins chosen are those which are compatible preferentially with the elastomer block. The weight fraction of the resins in the pressure sensitive adhesive is typically up to 40% by weight, more preferably up to 30% by weight. It is also possible, optionally, to add plasticizers, fillers (e.g., fibers, carbon black, zinc oxide, titanium dioxide, chalk, solid or hollow glass beads, microbeads of other materials, silica, silicates), nucleators, expandants, compounding agents and/or aging inhibitors, in the form of primary and secondary antioxidants or in the form of light stabilizers, for example.

The internal strength (cohesion) of the pressure sensitive adhesive is preferably produced by physical crosslinking of the polymer blocks P(A). The resulting physical crosslinking is typically thermoreversible. For irreversible crosslinking, the adhesives may additionally be crosslinked chemically. For this purpose, the acrylic block copolymer pressure sensitive adhesives used for the strippable systems of the invention can optionally comprise compatible crosslinking substances. Examples of suitable crosslinkers include metal chelates, polyfunctional isocyanates, polyfunctional amines, and polyfunctional alcohols. Additionally, polyfunctional acrylates can be used with advantage as crosslinkers for actinic radiation.

For the optional crosslinking with UV light, UV-absorbing photoinitiators are added to the polyacrylate-containing block copolymers employed in the systems of the invention. Useful photoinitiators which can be used to great effect are benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxy-acetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime.

The abovementioned photoinitiators and others which can be used, including those of the Norrish I or Norrish II type, can contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholinyl ketone, aminoketone, azobenzoin, thioxanthone, hexaarylbisimidazole, triazine or fluorenone, it being possible for each of these radicals to be further substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, consult Carroy et al. in "Chemistry and Technology of UV and EB Formulation for Coatings, Inks and Paints", Oldring (ed.), 1994, SITA, London.

In principle it is also possible to crosslink the pressure sensitive adhesives used in accordance with the invention using electron beams. Typical irradiation devices which may be employed are linear cathode systems, scanner systems, and segmented cathode systems, in the case of electron beam accelerators. A detailed description of the state of the art, and the most important process parameters, can be found in Skelhorne, Electron Beam Processing, in Chemistry and Technology of UV and EB Formulation for Coatings, Inks and Paints, Vol. 1, 1991, SITA, London. The typical acceleration voltages are situated within the range between 50 kV and 500 kV, preferably between 80 kV and 300 kV. The radiation doses used range between 5 to 150 kGy, in particular between 20 and 100 kGy.

Self-Adhesive Tapes (Product Constructions)

The strippable systems may be constructed in particular from:

a] single-layer adhesive sheets composed of a pressure sensitive adhesive layer comprising one or more acrylic block copolymers as base polymer(s).

b] multilayer adhesive sheets which use a layer based on acrylic block copolymers as their pressure sensitive adhesive layer, on one or both sides.

Adhesive sheets in accordance with the inventive strippable systems can with preference be formed in accordance with DE 44 28 587 A1, DE 198 42 864 A1, DE 198 42 865 A1, DE 199 38 693 A1, be modified in accordance with DE 44 31 914 A1 with nontacky liners which are abhesive with respect to the pressure sensitive adhesive, be used in products in accordance with DE 43 39 604 A1, be equipped with a grip tab in accordance with DE 42 22 849 A1, WO 98/03601 A1, DE 196 27 400 A1, be used as the sole pressure sensitive adhesive or as the outer ply in multilayer adhesive sheets, in products in accordance with DE 196 49 727 A1, DE 196 49 728 A1, DE 196 49 729 A1, DE 198 20 858 A1.

The strippable systems of the invention advantageously possess one of the product constructions described in more detail below:

a) Single-Layer Constructions

Figure 1:
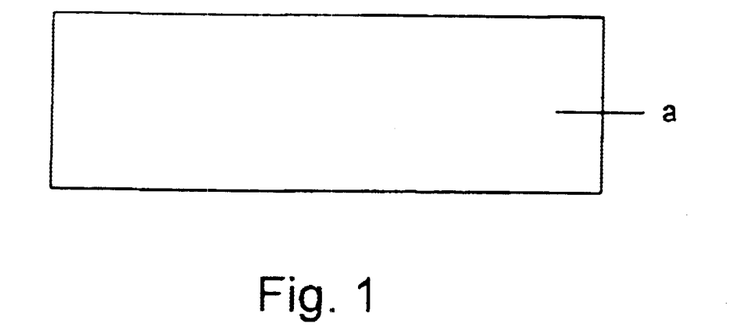
FIG. 1 shows a single layer adhesive sheet construction.

Because of the high cohesion of the acrylic block copolymers, acrylic block copolymer self-adhesive strips or sheets can be produced from a single layer a (FIG. 1) with a thickness of up to several millimeters. Owing to the intrinsic UV stability, such self-adhesive strips/sheets require very small amounts, if any, of light stabilizers. Water-clear-transparent embodiments of high light stability are therefore easy to obtain. The self-adhesive strips/sheets have a thickness of preferably more than 100 μm, more preferably more than 350 μm.

The shape of the self-adhesive strips can be, for example, rectangular or else with a taper toward the end of the adhesive strips, for example, in accordance with DE 44 28 587 A1 and DE 198 42 865 A1, although not excluding other shapes.

b) Multilayer Constructions

Figure 2:
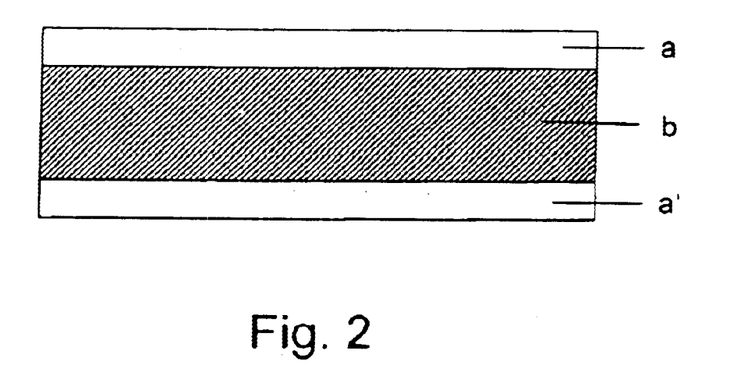
FIG. 2 shows a three layered adhesive sheet construction.
Figure 3:
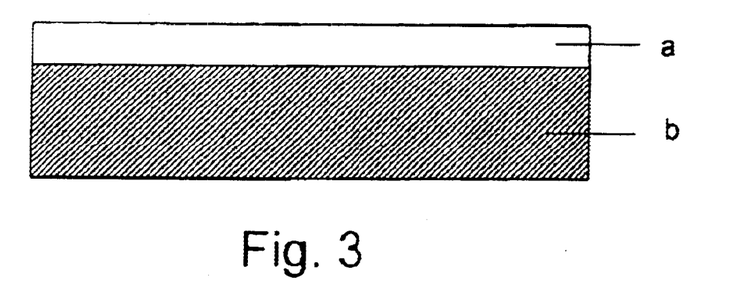
FIG. 3 shows a two layered adhesive sheet construction.

Furthermore, based on the strippable systems of the invention comprising acrylic block copolymers, it is possible to use multilayer self-adhesive strips/sheets, examples being two-layer, three-layer or else multilayer systems (see FIG. 2: three-layer construction; FIG. 3: two-layer construction).

The strippable systems of the invention are likewise usable in the form of multilayer constructions comprising layers containing none of the acrylic block copolymers as described above. Three-layer self-adhesive tapes of this kind, for example, comprise a middle layer b and two outer layers a and a' (FIG. 2). Layer b can contain, for example, elastomers such as natural rubber, synthetic polyisoprene, polybutadiene or thermoplastic elastomers such as styrene block copolymers (e.g., styrene-isoprene-styrene, styrene-butadiene-styrene or their hydrogenated analogs styrene-ethylene/propylene-styrene and styrene-ethylene/butylene-styrene) or the PMMA-containing polymers that are analogous to the aforementioned styrene block copolymers, namely poly(MMA-isoprene-MMA), poly(MMA-butadiene-MMA), poly(MMA-ethylene/propylene-MMA), and poly(MMA-ethylene/butylene-MMA), in straight form or in the form of a blend with resins and/or other additives. The thickness of the layer b is preferably at least 50 μm, with particular preference at least 100 μm. The outer layers a and a' are composed of acrylic block copolymer pressure sensitive adhesives, as described above, and may be identical or different in construction. Acrylic block copolymer outer layers can have identical or different thicknesses and are typically at least 10 μm thick, more preferably at least 25 μm thick.

Strippable systems in the form of two-layer systems consist of two layers, a and b (FIG. 3).

Layer b can be constructed, for example, from elastomers such as natural rubber or thermoplastic elastomers such as acrylic block copolymers or styrene block copolymers with polydiene middle blocks in straight form or in the form of a blend with resins and/or other additives. Layer b is characterized in particular by a thickness of at least 10 μm, preferably by a thickness of not less than 25 μm, more preferably by a thickness of not less than 100 μm. The top layer a is composed of acrylic block copolymer pressure sensitive adhesives, as described above. The outer layer typically has a thickness of not less than 10 μm, more preferably not less than 25 μm.

The shape of the self-adhesive strips may, here again, be rectangular or else be designed with a taper toward the end of the adhesive strips, in accordance, for example, with DE 44 28 587 A1 and DE 198 42 865 A1, although this does not rule out other shapes.

c) Double-Sided Adhesive Tape with Carrier

Acrylic block copolymers further permit the construction of double-sided self-adhesive tapes/sheets, comprising a carrier, which may contain, optionally, film carriers as the middle layer in order to further improve the cohesion, or else carriers comprising foam material, which can lead, for example, to improved conformability of the self-adhesive strips/sheets to rough substrate surfaces.

Test Methods

A. Loss of Tack

Debond forces were measured on stretched and unstretched self-adhesive films using a probe tack instrument (Texture Analyser TA.XT2iHR from Stable Micro Systems). Each of the strippable self-adhesive tapes was bonded, stretched and unstretched, to a double-sided adhesive tape fixed on a steel carrier in order to keep the degree of stretching (500%) constant during measurement. For measuring the maximum detachment force, a die of polished steel with a spherical surface (diameter 1.2 cm) was used, with a pressing force of 2 N, an approach speed of 0.5 mm/min, a withdrawal speed of 5 mm/min, and a contact time of 0.01 s. The device records the maximum force occurring during the detachment process, $F_{max}$. On each of the samples, ten measurements are taken at different sites on the self-adhesive strip surface. The loss of tack, in %, is reported as $$\left(1 - \frac{F_{max} \text{ (stretched)}}{F_{max} \text{ (unstretched)}}\right) \cdot 100.$$

Between finger tack and the maximum detachment force measured in this way there exists approximately the following correlation:

| $F_{max}$ | Finger tack |
|---|---|
| 0.5 N | very low (– –) |
| 1 N–3 N | Low (–) |
| 3 N–6 N | Medium (0) |
| 6 N–8 N | High (+) |
| >8 N | very high (++) |

B. Tensile Strength, Elongation at Break, Stress Values

The test took place in accordance with DIN 53504 (May 1994) using the S2 dumbbells described therein. The tensile test was carried out in accordance with section 6.4.1 b) using an attachment measurement system (not contactless), but deviating from the specification of that section by operating with an advance speed of 300 mm/min for recording the force/length change curve. Evaluation was carried out in accordance with sections 7.2, 7.3, and 7.4.

C. Shear Adhesion Times

The test took place in accordance with PSTC-7. A 50 μm thick pressure sensitive adhesive layer is applied to a 25 μm thick PET sheet. A strip of this sample, 1.3 cm wide, is bonded to a polished steel plate over a length of 2 cm, by rolling back and forth over it three times using a 2 kg roller. The plates are equilibrated for 30 minutes under test conditions (temperature and humidity) but without loading. Then the test weight is hung on, exerting a shearing stress parallel to the bond surface, and the time taken for the bond to fail is measured. If a holding time of 10 000 minutes is reached, the test is terminated before the adhesive bond fails.

D. Bond Strength

The testing of the peel adhesion (bond strength) was carried out in accordance with PSTC-1. A 50 μm thick pressure sensitive adhesive layer is applied to a 25 μm thick PET sheet. A strip of this sample, 2 cm wide, is bonded to a steel plate by rolling back and forth over it three times using a 2 kg roller. This steel plate is clamped in and the self-adhesive strip is pulled off from its free end at a peel angle of 180°, on a tensile testing machine.

E. Stripping Force

In order to determine the detachment force (stripping force) which occurs during detachment by extensive stretching, a self-adhesive strip measuring 50 mm×20 mm (length×width) is bonded between two steel plates (arranged congruently to one another) measuring 50 mm×30 mm, by rolling back and forth over it twice using a 2 kg roller, in such a way that a grip tab region protrudes which is sufficient for fastening into the clamping jaw of a force measurement instrument, and the assembly is then pressed with a force of 500 N for 6 seconds. The bonds are stored at +40° C. for 24 h. Each of the steel plates, at its bottom end, carries a bore intended to receive an S-shaped steel hook. The bottom end of the steel hook carries a further steel plate by means of which the test setup can be fixed into the lower clamping jaw of a tensile testing machine for the purpose of measurement. After reconditioning to RT, the adhesive sheet strip is removed parallel to the bond plane with a pulling speed of 1000 mm/min. During this procedure, the required detachment force (stripping force) is measured, in N/cm. For better comparability with the maximum stress values from the tensile stress/elongation experiments, the results of the stripping force measurements are reported in units of MPa, i.e., in the form of a stripping stress. Finally, the steel plates are examined for the presence of residues of adhesive.

F. Thermoshear Path

The self-adhesive film for measurement is fixed to a vertical, temperature-controllable, 1 mm thick, abraded V2A (stainless) steel substrate plate in such a way that the film projects about 3 mm beyond the plate at the top. Fixing was carried out by rolling back and forth over the film twice, using a 2 kg roller. The bonded area is 13 mm×10 mm (height×width). Within the bonded region, the film backing is reinforced centrally over a width of about 6 mm by application of a 100 μm thick PETP backing, carrying a pressure sensitive adhesive, on the reverse side. The reinforcing film protrudes about 1 mm at the top beyond the self-adhesive film that is to be measured. The shear paths are recorded using a plunger coil (differential HF transformer) whose probe lies on the auxiliary backing. When a shearing stress is applied, which is done by suspending a weight on the self-adhesive strip, the pin of the plunger coil is deflected in accordance with the shearing deformation that occurs within the bonded region. Within the useful measurement range of 2500 μm, this leads to a linear change in the induced electrical voltage in the receiver coil. The value detected is the sum of elastic and viscous shearing deformation. The resolution accuracy of the measurement apparatus is approximately 1.2 μm. By means of a heater control system, a temperature program is run (start temperature: +30° C.; end temperature: +180° C.; heating rate: 2 K/min). The temperature at which a shear path of 250 μm is attained ($T_{250\ \mu m}$), and the temperature at bond failure ($T_{fracture}$), are recorded.

G. Aging Stability

Adhesive strips 2 cm wide were bonded to glass plates by rolling back and forth over them twice using a 2 kg roller and were exposed for 7 days under a sunlight lamp (Osram Ultra Vitalux 300 W). The distance between sample and light source was 35 cm, the temperature in the exposure chamber +50° C. The exposed sample was examined visually for discoloration and was compared with an unexposed sample. Subsequently, a bond strength test was conducted in analogy to PSTC-1 (see also method D in the present text) and compared with an unexposed sample. After the pressure sensitive adhesive had been removed from the glass plate, the substrate surface was examined for any residues of adhesive.

Test Specimen Production

Preparation of a RAFT Regulator

The regulator bis-2,2'-phenylethyl trithiocarbonate (IX) was prepared starting from 2-phenylethyl bromide using carbon disulfide and sodium hydroxide in accordance with instructions in Synth. Comm., 1988, 18 (13), 1531. Yield: 72%. $^1$H-NMR (CDCl$_3$), δ: 7.20–7.40 ppm (m, 10 H); 3.81 ppm (m, 1 H); 3.71 ppm (m, 1 H); 1.59 ppm (d, 3 H); 1.53 ppm (d, 3 H).

Preparation of Nitroxides

(a) Preparation of the difunctional alkoxyamine (XI):

The experimental instructions from Journal of American Chemical Society, 1999, 121(16), 3904 were followed. The starting materials used were 1,4-divinylbenzene and nitroxide (XII).

(XI)

(b) Preparation of the nitroxide (XII) (2,2,5-trimethyl-4-phenyl-3-azahexane 3-nitroxide): The experimental instructions from Journal of American Chemical Society, 1999, 121(16), 3904 were followed.

(XII)

Commercial Raw Materials Used

| Trade name | Structure | Manufacturer |
|---|---|---|
| Vazo 67 | 2,2'-azobis(2-methylbutanenitrile) | DuPont |
| Kraton D1102 | PS-PB-PS, 29% styrene content, about 20% PS-PB diblock content | Shell Chemicals |
| Regalite R1100 | Hydrogenated C9 tackifier resin | Hercules |
| Norsolene M1080 | C9–C5 tackifier resin | Cray Valley |
| Dertophene T 110 | Terpene-phenolic tackifier resin | DRT |
| Desmodur L75 | Aromatic isocyanate | Bayer AG |

EXAMPLE 1

Preparation of PS-P(BuA/AA)-PS (i) A reactor conventional for radical polymerization is charged under nitrogen with 362 g of styrene and 3.64 g of regulator (IX). This initial charge is heated to 110° C. and initiated with 0.1 g of Vazo 67® (DuPont). It is stirred at 110° C. for 24 hours, then initiated with a further 0.1 g of Vazo 67® and polymerized for 24 hours more. During polymeriztion there is a marked rise in viscosity. This is compensated by adding 150 g of toluene. (ii) In a second step, the product from (i) is admixed with 2.285 kg of n-butyl acrylate (BuA), 97 g of acrylic acid (AA) and 750 g of acetone. The mixture is heated to 60° C. and initiated with 0.75 g of Vazo 67. After 3 hours, it is reinitiated with 0.75 g of Vazo 67®. After 5 hours it is diluted with 400 g of acetone. After 14 hours, the polymerization is at an end and the batch is cooled.

The product obtained is concentrated in a vacuum drying cabinet at 10 torr and 45° C. for 12 hours.

Characterization: PS-P(BuA/M)-PS; $M_n$=176 kg/mol; $M_w/M_n$(GPC)=1.8; comonomer contents: 13% styrene, 4% acrylic acid, 83% n-butyl acrylate; conversion: 96% (molar mass figures from GPC against polystyrene standards).

EXAMPLE 2

Preparation of PMMA-PBuA-PMMA

General procedure: A mixture of the alkoxyamine (XI) and the nitroxide (XII) (10 mol % with respect to alkoxyamine (XI)) is mixed with the monomer B (for the subsequent polymer block P(B)), degassed several times with cooling to −78° C., and then heated at 110° C. under pressure in a closed vessel. After a reaction period of 36 h, the monomer A (for the subsequent polymer block P(A)) is added and polymerization is continued at this temperature for 24 hours.

In analogy to the general procedure of polymerization, 0.739 g of the difunctional initiator (XI), 0.0287 g of the free nitroxide (XII), 500 g of n-butyl acrylate (B) and 105 g of methyl methacrylate (A) were used. The polymer was isolated by cooling to room temperature, dissolving the PMMA-PBuA-PMMA block copolymer in 750 ml of dichloromethane and then precipitating the polymer form 6.0 l of methanol (cooled to −78° C.) with vigorous stirring. The precipitate was filtered off over a cooled frit. The product obtained was concentrated in a vacuum drying cabinet at 10 torr and 45° C. for 12 hours.

Characterization: PMMA-PBuA-PMMA; $M_n$=186 kg/mol; $M_w/M_n$(GPC)=1.7; 17% methyl methacrylate, 83% n-butyl acrylate; conversion: 94%.

EXAMPLE 3

Comparison Sample 1

For comparison, commercial tesa® Powerstrips® were analyzed, which constitute a single-layer self-adhesive system consisting of styrene block copolymer (comprising block copolymers with nonhydrogenated elastomer blocks), tackifier resin, and additives, without a backing (cf. DE 42 22 849 C2).

EXAMPLE 4

Comparison Sample 2

Additionally, a chemically crosslinked acrylic copolymer ("crosslinked acrylate") prepared by conventional radical polymerization was analyzed. Its composition is 48.5% n-butyl acrylate, 48.5% 2-ethylhexyl acrylate, 2% glycylidene methacrylate, 1% acrylic acid, crosslinked with Desmodur L75 and zinc chloride. Comparison sample 2 contained the tackifier resin Dertophene T110® at 30%.
Production of Strippable Self-Adhesive Tapes
  (i) Single-layer systems were obtained by pressing the solvent-free material (temperature-controllable press: model KHL 50 from Bucher-Guyer) at 180° C. under 600 kg for 5 minutes and then under 6 t for 1 minute, and punching out self-adhesive strips measuring 20 mm×50 mm.
  (ii) Three-layer systems were obtained by applying the pressure sensitive adhesive film a to a siliconized release paper, then transferring it by lamination to an elastomer core produced beforehand by pressing (and consisting of 60 parts of Kraton D 1102 and 40 parts of Regalite R 1100), and then punching out self-adhesive strips measuring 20 mm×50 mm. The attachment of the outer layer to the core is such that, after bonding and redetachment by stretching, the outer layers remain on the elastomer core and the substrate remains without residue.
  (iii) Systems comprising backings were produced with a foam material backing by applying the top layer to siliconized release paper, transferring it by lamination to the fluorine-pretreated foam and then punching out self-adhesive strips measuring 20 mm×50 mm. The pressure sensitive adhesive was coated directly onto sheet backings.

EXAMPLES

The following strippable self-adhesive strips may be presented here as examples:

| Designation | Product construction | Layer thickness | Materials |
|---|---|---|---|
| Adhesive strip 1 | Single-layer | a = 760 μm | a: PS-P(BuA/AA)-PS |
| Adhesive strip 2 | Three-layer | a = 50 μm | a: PS-P(BuA/AA)-PS |
| | | b = 700 μm | b: Kraton D1102 + 40% Regalite R1100 |
| | | a' = 50 μm | a': PS-P(BuA/AA)-PS |
| Adhesive strip 3 | Three-layer | a = 50 μm | a: PMMA-PBuA-PMMA |
| | | b = 700 μm | b: Kraton D1102 + 40% Regalite R1100 |
| | | a' = 50 μm | a': PMMA-PBuA-PMMA |
| Adhesive strip 4 | Single-layer | a = 650 μm | a: PMMA-PBuA-PMMA |
| tesa ® Powerstrip ® | Single-layer | a = 650 μm | a: see above |

(MMA: methyl methacrylate; BuA: butyl acrylate; AA: acrylic acid; S: styrene; P: poly-)

To start with, the mechanical properties of some exemplary constructions of strippable systems of the invention (self-adhesive strips) will be discussed. It is known that the elongation at break of acrylic block copolymers typically fails to attain that of polydiene-containing styrene block copolymers (G. Holden, N. R. Legge, R. Quirk, H. E. Schroeder (ed.), Thermoplastic Elastomers, 2nd ed., 1996, C. Hanser Verlag, Munich).

This is also demonstrated with the measurements on adhesive strip 4. The use of self-adhesive strips constructed from a plurality of layers, containing highly extensible middle layers based on styrene block copolymers, leads, as evident from adhesive strip 3, to a distinct improvement in this property. Surprisingly, the outer layers, comprising acrylic block copolymer, do not tear even under high stretch such as occurs when the adhesive strips are removed stretchingly from a joint. Likewise, no detachment of the outer layers from the styrene block copolymer middle layer is observed.

It is also evident, surprisingly, from the example represented by adhesive strip 1 that a middle layer of high elongation at break is not absolutely necessary in every case in order to achieve a high elongation at break with acrylic block copolymer self-adhesive strips. Adhesive strip 1 is designed as a single layer system and contains polystyrene endblocks. The elongation at break of this system, astonishingly, is almost 1000%.

| Tensile stress/elongation characteristics, stripping force | | | |
|---|---|---|---|
| Designation | Max. stress $\sigma_{max}$ | Max. elongation $\epsilon_{max}$ | Stripping stress |
| Adhesive strip 1 | 9.5 MPa | 960% | 0.8 MPa |
| Adhesive strip 2 | 5.9 MPa | 870% | 1.2 MPa |
| Adhesive strip 3 | 7.0 MPa | 900% | 1.2 MPa |
| Adhesive strip 4 | 5.9 MPa | 450% | — |
| tesa ® Powerstrip ® | 11.3 MPa | 1230% | 1.8 MPa |

A good qualitative test which shows whether a pressure sensitive adhesive is suitable in principle for use in strippable self-adhesive strips examines the residueless and nondestructive redetachability of paper strips bonded to steel using a self-adhesive strip comprising the pressure sensitive adhesive under test. This simple but highly informative test was applied to the self-adhesive strips presented in the table above. All of them were removable from the joint between steel and paper without residue or destruction by stretching parallel to the bond plane. Although chemically crosslinked, conventional acrylic copolymers also often exhibit high extensibility, it is found, when such systems are detached by stretching parallel to the adhesive film, that they typically damage the surface of the paper and/or that they require very high detachment forces (stripping forces). A high elongation at break alone, therefore, is not an adequate criterion for strippable self-adhesive strips. Further criteria are whether the self-adhesive tape can be removed from the joint with a low stripping force and whether, additionally, the friction in contact with one of the substrate surfaces is sufficiently low. The latter properties are found particularly when the pressure sensitive adhesive loses its self-adhesion (tack) to a very considerable extent under stretch.

A corresponding loss of tack can be quantified very effectively using a die tack instrument. In the case of tesa® Powerstrips®, a strippable pressure-sensitively adhesive product based on a styrene block copolymer/resin blend, it is known that the peel force of a steel object on a stretched surface in the die tack test is lower by up to 80% than for the unstretched case. Chemically crosslinked systems in accordance with the prior art, based on acrylic copolymers, in contrast, exhibit a much lower loss of tack. The strippable systems of the invention based on acrylic block copolymers surprisingly exhibit, just like pressure sensitive adhesives based on styrene block copolymer/resin blends, a high loss of tack, regardless of whether the entire self-adhesive strip consists of an acrylic block copolymer pressure sensitive adhesive or whether, in the case of multilayer product constructions, only the top layers or outer layers relevant to bonding comprise acrylic block copolymers. In both cases, such self-adhesive strips can be redetached without residue or destruction from the steel substrate with very little friction, in contrast to conventional self-adhesive strips containing acrylic copolymer. The stripping forces required for removing the self-adhesive strip from the joint are likewise within the range of values known for pressure sensitive adhesives based on styrene block copolymers, and are therefore a further indication that acrylic block copolymers are suitable for use as strippable self-adhesive strips.

| Loss of tack under stretch | | | |
|---|---|---|---|
| Designation | Removal force (unstretched) | Removal force (stretched) | Loss of tack |
| Adhesive strip 1 | 5.0 N | 1.4 N | 75% |
| Adhesive strip 2 | 5.5 N | 1.4 N | 75% |
| Adhesive strip 3 | 5.6 N | 1.2 N | 79% |
| tesa ® Powerstrip ® | — | — | 80% |
| Crosslinked polyacrylate | 6.4 N | 4.7 N | 27% |

In order, moreover, to allow residueless detachment of the self-adhesive strip, the pressure sensitive adhesive must be characterized by good cohesive properties. A material parameter describing the aforementioned property, in addition to the maximum stress $\sigma_{max}$, is the shear adhesion time, which at the same time permits statements to be made about the holding power under different shearing loads and at different application temperatures. For the adhesives used in the strippable systems of the invention, shear adhesion times were measured on PET backings, with the holding times found for the acrylic block copolymers described here being typically substantially higher than those known for conventional, state of the art, chemically crosslinked, acrylic copolymer pressure sensitive adhesives. Thus for acrylic block copolymer pressure-sensitive adhesives, even at 70° C. under a load of 10 N, holding times of >10 000 minutes were found, and also at 23° C. under 20 N.

Attention may also be drawn at this point to the typically achievable bond strengths of from 4 to 6 N/cm for a layer thickness of 50 μm. It is found that a certain amount of acrylic acid in a polymer block P(B) leads to a distinct increase in the bond strength to steel. Accordingly, polymerization methods appropriate for preparing the pressure sensitive adhesives of the systems of the invention are preferably those which allow the copolymerization of acrylic acid, which is something which typically can be provided by radical methods. Similarly, the polymerization processes described above are also capable of incorporating such monomers into an acrylic block copolymer, so that good bond strengths are achieved on other surfaces too. As an example, mention may be made here of the use of 2-ethylhexyl acrylate, whose incorporation leads to a pressure sensitive adhesive that is particularly suitable for bonding to nonpolar surfaces.

| | Shear adhesion times, bond strength (steel) | | | | |
|---|---|---|---|---|---|
| Material | 23° C., 10 N | 40° C., 10 N | 70° C., 10 N | 23° C., 20 N | Peel 180° |
| PS-P(BuA/AA)-PS | >10 000 min | >10 000 min | >10 000 min | >10 000 min | 6.0 N/cm |
| PMMA-PBuA-PMMA | >10 000 min | >10 000 min | >10 000 min | >10 000 min | 4.4 N/cm |

As an additional method, thermoshear path measurements permit differentiated statements to be made about the shearing behavior of pressure sensitive adhesives as a function of temperature. Optionally, different shearing loads are specified, and thus different holding power requirements simulated. In order to describe the thermal load-bearing capacity of the adhesive bonds, two temperatures are used here: firstly, the temperature at which the bond has a shear of 250 μm and secondly the temperature at which the bond fails. Here again it is found that acrylic block copolymer pressure sensitive adhesives are superior in performance to conventional, chemically crosslinked acrylic block copolymers.

| | Thermoshear path | | | |
|---|---|---|---|---|
| | $T_{250\,\mu m}$ | | $T_{fracture}$ | |
| Material | 100 g load | 500 g load | 100 g load | 500 g load |
| PS-P(BuA/AA)-PS | 104° C. | 68° C. | 120° C. | 85° C. |
| PMMA-PBuA-PMMA | 155° C. | 72° C. | 170° C. | 72° C. |
| Crosslinked acrylate | — | 30° C. | — | 38° C. |

In contrast to strippable self-adhesive strips based on styrene block copolymers are systems based on acrylic block copolymers which have the advantage that they can easily be produced in water-clear transparent forms. Because acrylates are insusceptible to UV radiation, there is no need for additives, which lead to clouding or coloring of the pressure sensitive adhesives. All of the acrylate-based strippable self-adhesive strips of the invention are distinguished by water-clear transparency. The fact that good aging stability is ensured despite the absence of UV stabilizers is shown by UV tests. For direct comparison, self-adhesive strips containing acrylic block copolymer were bonded to glass plates. Some of these specimens were exposed beneath a sunlight lamp, whose spectrum also includes the UV region. In exactly the same way as the unexposed, comparison specimens, the exposed specimens exhibited water-clear transparency. There was also virtually no change in bond strength (the slight increase can be attributed to the slight increase in temperature brought about by exposure). Examination of the substrate indicated no residues whatsoever for both exposed and unexposed specimens. Similarly, the pressure sensitive adhesive showed no defects and could be used again. Distinct advantages are evident in comparison to systems based on styrene block copolymer.

| | | Aging stability | | |
|---|---|---|---|---|
| Material | Exposure period | Visual appearance after exposure | Bond strength 180° (glass) | Residues on substrate |
| PMMA-PBuA-PMMA | 0 days | Transparent, colorless | 7.3 N/cm | None |
| PMMA-PBuA-PMMA | 7 days | Transparent, colorless | 8.3 N/cm | None |
| tesa ® Powerstrip ® | 0 days | Not transparent, off-white | 40 N/cm* | None |
| tesa ® Powerstrip ® | 7 days | Not transparent, off-white | Not determinable** | Tearing |

*Powerstrips reinforced on reverse with glass fiber reinforced adhesive tape (e.g., tesa ® pack 53311), removal angle: 90°
**Adhesive strip irreversibly stuck to glass An important advantage of pressure sensitive adhesives based on acrylic block copolymers is that they exhibit very good adhesion properties even without resins, and so resin blends are not absolutely necessary as is the case, for example, with styrene block copolymer adhesives. Finally, however, it can be shown that the surprising results for the product constructions presented so far are also achievable by resin-blended pressure sensitive adhesives. A three-layer system serves as an example of this (a: PS-P(BuA/AA)-PS+ 20% Norsolene M1080 (Cray Valley), 50 μm; b: Kraton D1102+40% Regalite R 1100, 650 μm; a': PS-P(BuA/AA)-PS+20% Norsolene M1080, 50 μm). The resulting data are comparable with those for the unblended systems described above.

What is claimed is:

1. A strippable system comprising at least one pressure sensitive adhesive based on at least one block copolymer, wherein said at least one block copolymer is based at least in part on (meth)acrylic acid derivatives, the block copolymers containing at least the unit P(A)-P(B)-P(A) composed of at least one polymer block P(B) and at least two polymer blocks P(A), where P(A) independently of one another represent homopolymer or copolymer blocks of monomers A, the polymer blocks P(A) each having a softening temperature in the range from +20° C. to +175° C., P(B) representing a homopolymer or copolymer block of monomers B, the polymer block P(B) having a softening temperature in the range from −100° C. to +10° C., and the polymer blocks P(A) and P(B) are not homogeneously miscible with one another.

2. The strippable system as claimed in claim 1, wherein the pressure sensitive adhesive has an elongation at break of at least 300%, measured by test method B, and a tensile strength of at least 3 MPa, measured by test method B.

3. The strippable system according to claim 1, wherein the construction of the block copolymer (copolymers) can be described by one or more of the following general formulae:

P(A)-P(B)-P(A)  (I)

P(B)-P(A)-P(B)-P(A)-P(B)  (II)

[P(A)-P(B)]$_n$X  (III)

[P(B)-P(A)-P(B)]$_n$X  (IV)

[P(A)-P(B)]$_n$X[P(B)]$_m$  (V), in which n=2 to 12, m=1 to 12, and X represents a difunctional or polyfunctional branching unit, wherein the polymer blocks P(A) independently of one another represent homopolymer or copolymer blocks of the monomers A, the polymer blocks P(A) each having a softening temperature in the range from +20° C. to +175° C.; and wherein the polymer blocks P(B) independently of one another represent homopolymer or copolymer blocks of the monomers B, polymer blocks P(B) each having a softening temperature in the range from −100° C. to +10° C.

4. The strippable system according to claim 1, wherein said at least one block copolymer has a symmetrical construction such that there are polymer blocks P(A) identical in chain length, chemical structure, or both; polymer blocks P(B) identical in chain length, chemical structure, or both; or any combination thereof.

5. The strippable system according to claim 1, wherein said at least one block copolymer meets one or more of the following criteria:

(a) a molar mass $M_n$ of between 10 000 and 600 000 g/mol, (b) a polydispersity $D=M_w/M_n$ of not more than 3, (c) a polymer block P(A) fraction of between 5 and 49% by weight, based on the triblock copolymer composition.

6. The strippable system according to claim 1, wherein the ratio of the chain lengths of the polymer blocks P(A) to those of the polymer blocks P(B) is chosen such that the polymer blocks P(A) are present in the form of a disperse phase ("domains") in a continuous matrix of the polymer blocks P(B).

7. The strippable system according to claim 1, wherein the pressure sensitive adhesive comprises a blend of one or more block copolymers with at least one block copolymer which contains the inversely constructed unit P(B)-P(A)-P(B) or at least one diblock copolymer P(A)-P(B), wherein the polymer blocks P(A) independently of one another represent homopolymer or copolymer blocks of monomers A, the polymer blocks P(A) each having a softening temperature in the range from +20° C. to +175° C., and wherein the polymer blocks P(B) independently of one another represent homopolymer or copolymer blocks of monomers B, the polymer blocks P(B) each having a softening temperature in the range from −100° C. to +10° C., or at least one polymer P'(A) or at least one polymer P'(B), wherein the polymers P'(A) represent homopolymers copolymers of the monomers A, or both, the polymers P'(A) each having a softening temperature in the range from +20° C. to +175° C., wherein the polymers P'(B) represent homopolymers or copolymers of the monomers B, or both, the polymers P'(B) each having a softening temperature in the range from −100° C. to +10° C., and wherein the polymers P'(A) or P'(B) or both are optionally miscible with the polymer blocks P(A) and/or P(B), respectively or any combination thereof.

8. The strippable system according to claim 1, wherein said at least one diblock copolymer meets one or more of the following criteria:

(a) a molar mass $M_n$ of between 5 000 and 600 000 g/mol, (b) a polydispersity $D=M_w/M_n$ of not more than 3, (c) a polymer block P(A) fraction of between 3 and 50% by weight, based on the diblock copolymer composition.

9. The strippable system according to claim 1, wherein the polymer blocks P(B) or the polymers P'(B), or both contain, at least in part, one or more grafted-on side chains.

10. The strippable system according to claim 1, wherein monomers B comprise:

from 75 to 100% by weight of acrylic or methacrylic acid derivatives, or both, of the general structure (VI)

$$CH_2=CH(R^1)(COOR^2) \qquad (VI)$$

where $R^1$=H or $CH_3$ and $R^2$=H or linear, branched or cyclic, saturated or unsaturated alkyl radicals having from 1 to 30 carbon atoms, from 0 to 25% by weight of vinyl compounds which optionally contain functional groups.

11. The strippable system according to claim 1, wherein the pressure sensitive adhesive is admixed with further components selected from the group consisting of tackifier resins plasticizers, fillers, nucleators, expandants, compounding agents, aging inhibitors and combinations thereof.

12. The strippable system according to claim 1, comprising a single-layer product construction in which the layer is composed of said at least one pressure sensitive adhesive and has a thickness of at least 100 μm.

13. The strippable system according to claim 1, comprising a multilayer product construction in which at least one of the layers is composed of said at least one pressure sensitive adhesive and has a thickness of at least 10 μm and in which optionally one of the further layers is composed of an elastomer and has a thickness of at least 100 μm.

14. The strippable system according to claim 1, comprising at least one backing or carrier layer.

15. The strippable system of claim 5, wherein said molar mass $M_n$ is between 30,000 and 400,000 g/mol.

16. The strippable system of claim 15, wherein said molar mass $M_n$ is between 50,000 and 300,000 g/mol.

17. The strippable system of claim 5, wherein said polymer block P(A) fraction is between 7.5 and 35% by weight.

18. The strippable system of claim 17, wherein said polymer block P(A) fraction is between 10 and 30% by weight.

19. The strippable system of claim 6, wherein said disperse phase is in the form of spherical or distortedly spherical domains.

20. The strippable system according to claim 8, wherein said molar mass $M_n$ is between 15,000 and 400,000 g/mol.

21. The strippable system of claim 20, wherein said molar mass $M_n$ is between 30,000 and 300,000 g/mol.

22. The strippable system according to claim 8, wherein said polymer block P(A) fraction is between 5 and 35% by weight.

23. The strippable system of claim 13, wherein said multilayer product construction is a two-layer or three-layer product construction.

24. The strippable system of claim 13, wherein said thickness of said at least one of the layers is at least 25 μm.

25. The strippable system of claim 13, wherein said one of the further layers has a thickness of at least 200 μm.

* * * * *

UNITED STATES PATENT AND TRADEMARK OFFICE
CERTIFICATE OF CORRECTION

PATENT NO. : 6,723,407 B2
DATED : April 20, 2004
INVENTOR(S) : Dollase et al.

It is certified that error appears in the above-identified patent and that said Letters Patent is hereby corrected as shown below:

Column 9,
Line 67, "heterocycles in a position" should read -- heterocycles in α position --

Signed and Sealed this

Thirty-first Day of August, 2004

JON W. DUDAS
*Director of the United States Patent and Trademark Office*